United States Patent
Sikora et al.

(10) Patent No.: US 7,667,849 B2
(45) Date of Patent: Feb. 23, 2010

(54) OPTICAL SENSOR WITH INTERFEROMETER FOR SENSING EXTERNAL PHYSICAL DISTURBANCE OF OPTICAL COMMUNICATIONS LINK

(75) Inventors: Edmund S. R. Sikora, Ipswich (GB); Peter Healey, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 11/403,200

(22) Filed: Apr. 13, 2006

(65) Prior Publication Data
US 2006/0256344 A1 Nov. 16, 2006

Related U.S. Application Data

(63) Continuation-in-part of application No. 10/573,266, filed as application No. PCT/GB2004/004169 on Sep. 29, 2004.

(30) Foreign Application Priority Data
Sep. 30, 2003 (GB) .................. 0322859.0

(51) Int. Cl.
*G01B 9/02* (2006.01)
(52) U.S. Cl. .................... 356/477
(58) Field of Classification Search ............ 356/479, 356/477, 478; 250/227.19, 227.27; 385/12
See application file for complete search history.

(56) References Cited

U.S. PATENT DOCUMENTS

| 4,297,887 A | 11/1981 | Bucaro |
| 4,397,551 A | 8/1983 | Bage et al. |
| 4,443,700 A | 4/1984 | Macedo et al. |
| 4,463,451 A | 7/1984 | Warmack et al. |
| 4,538,103 A | 8/1985 | Cappon |
| 4,572,949 A * | 2/1986 | Bowers et al. ......... 250/227.27 |
| 4,593,385 A | 6/1986 | Chamuel |
| 4,649,529 A | 3/1987 | Avicola |
| 4,654,520 A | 3/1987 | Griffiths |
| 4,668,191 A | 5/1987 | Plischka |

(Continued)

FOREIGN PATENT DOCUMENTS

EP     0 251 632 A2    1/1988

(Continued)

OTHER PUBLICATIONS

International Search Report mailed Jan. 14, 2005 in International Application No. PCT/GB2004/004169.

(Continued)

*Primary Examiner*—Tarifur Chowdhury
*Assistant Examiner*—Jonathon D Cook
(74) *Attorney, Agent, or Firm*—Nixon & Vanderhye P.C.

(57) ABSTRACT

An optical sensing method transmits radiation from a source onto an optical link, the radiation being passed through an unbalanced interferometer connected between the source and the link. The radiation which is reflected back and has travelled through a portion of the link which is subject to an external disturbance is received and passed through the same unbalanced interferometer. A detector is used to detect the radiation that has returned through the unbalanced interferometer. To improve sensitivity, the unbalanced interferometer includes a coupler for coupling radiation to the detector, the coupler being an N ×N coupler where N is an integer greater or equal to 3.

17 Claims, 2 Drawing Sheets

U.S. PATENT DOCUMENTS

| | | |
|---|---|---|
| 4,688,200 A | 8/1987 | Poorman et al. |
| 4,697,926 A | 10/1987 | Youngquist et al. |
| 4,708,471 A | 11/1987 | Beckmann et al. |
| 4,708,480 A | 11/1987 | Sasayama et al. |
| 4,770,535 A | 9/1988 | Kim et al. |
| 4,781,056 A | 11/1988 | Noel et al. |
| 4,805,160 A | 2/1989 | Ishii et al. |
| 4,847,596 A | 7/1989 | Jacobson et al. |
| 4,907,856 A | 3/1990 | Hickernell |
| 4,976,507 A | 12/1990 | Udd |
| 4,991,923 A | 2/1991 | Kino et al. |
| 4,994,668 A | 2/1991 | Lagakos et al. |
| 4,994,886 A | 2/1991 | Nadd |
| 5,004,912 A | 4/1991 | Martens et al. |
| 5,015,842 A | 5/1991 | Fradenburgh et al. |
| 5,046,848 A | 9/1991 | Udd |
| 5,051,965 A | 9/1991 | Poorman |
| 5,093,568 A | 3/1992 | Maycock |
| 5,104,391 A | 4/1992 | Ingle et al. |
| 5,140,559 A | 8/1992 | Fisher |
| 5,173,743 A | 12/1992 | Kim |
| 5,187,362 A | 2/1993 | Keeble |
| 5,191,614 A | 3/1993 | LeCong |
| 5,194,847 A | 3/1993 | Taylor et al. |
| 5,206,924 A | 4/1993 | Kersey |
| 5,223,967 A | 6/1993 | Udd |
| 5,311,592 A | 5/1994 | Udd |
| 5,313,266 A * | 5/1994 | Keolian et al. ............ 356/477 |
| 5,319,609 A | 6/1994 | Regnault |
| 5,351,318 A | 9/1994 | Howell et al. |
| 5,355,208 A | 10/1994 | Crawford et al. |
| 5,361,130 A | 11/1994 | Kersey et al. |
| 5,363,463 A | 11/1994 | Kleinerman |
| 5,373,487 A | 12/1994 | Crawford et al. |
| 5,379,357 A | 1/1995 | Sentsui et al. |
| 5,412,464 A | 5/1995 | Thomas et al. |
| 5,457,998 A | 10/1995 | Fujisaki et al. |
| 5,473,459 A | 12/1995 | Davis |
| 5,491,573 A | 2/1996 | Shipley |
| 5,497,233 A | 3/1996 | Meyer |
| 5,500,733 A | 3/1996 | Boisrobert et al. |
| 5,502,782 A | 3/1996 | Smith |
| 5,604,318 A | 2/1997 | Fasshauer |
| 5,636,021 A | 6/1997 | Udd |
| 5,637,865 A | 6/1997 | Bullat et al. |
| 5,663,927 A | 9/1997 | Olson et al. |
| 5,691,957 A | 11/1997 | Spiesberger |
| 5,694,114 A | 12/1997 | Udd |
| 5,754,293 A | 5/1998 | Farhadiroushan |
| 5,767,950 A | 6/1998 | Hawver et al. |
| 5,778,114 A | 7/1998 | Eslambolchi et al. |
| 5,936,719 A | 8/1999 | Johnson |
| 5,975,697 A | 11/1999 | Podoleanu |
| 5,991,479 A | 11/1999 | Kleinerman |
| 6,072,921 A | 6/2000 | Frederick et al. |
| 6,075,628 A | 6/2000 | Fisher et al. |
| 6,115,520 A | 9/2000 | Laskowski et al. |
| 6,194,706 B1 | 2/2001 | Ressl |
| 6,195,162 B1 | 2/2001 | Varnham et al. |
| 6,269,198 B1 | 7/2001 | Hodgson et al. |
| 6,269,204 B1 | 7/2001 | Ishikawa |
| 6,285,806 B1 | 9/2001 | Kersey et al. |
| 6,315,463 B1 | 11/2001 | Kropp |
| 6,459,486 B1 * | 10/2002 | Udd et al. .................. 356/483 |
| 6,594,055 B2 | 7/2003 | Snawerdt |
| 6,625,083 B2 | 9/2003 | Vandenbroucke |
| 6,628,570 B2 | 9/2003 | Ruffa |
| 6,788,417 B1 | 9/2004 | Zumberge et al. |
| 6,859,419 B1 | 2/2005 | Blackmon et al. |
| 2001/0028766 A1 | 10/2001 | Hatami-Hanza |
| 2002/0196447 A1 | 12/2002 | Nakamura et al. |
| 2003/0103211 A1 | 6/2003 | Lange et al. |
| 2003/0117893 A1 | 6/2003 | Bary |
| 2003/0174924 A1 | 9/2003 | Tennyson |
| 2004/0027560 A1 | 2/2004 | Fredin et al. |
| 2004/0113056 A1 | 6/2004 | Everall et al. |
| 2004/0201476 A1 | 10/2004 | Howard |
| 2007/0009600 A1 | 1/2007 | Edgren et al. |
| 2007/0065150 A1 | 3/2007 | Sikora et al. |
| 2007/0264012 A1 | 11/2007 | Healey et al. |
| 2008/0013161 A1 | 1/2008 | Tokura et al. |
| 2008/0018908 A1 | 1/2008 | Healey et al. |
| 2008/0123085 A1 | 5/2008 | Sikora et al. |
| 2008/0166120 A1 | 7/2008 | Heatley et al. |
| 2008/0219093 A1 | 9/2008 | Heatley et al. |
| 2008/0219660 A1 | 9/2008 | Healey et al. |
| 2008/0278711 A1 | 11/2008 | Sikora et al. |
| 2009/0014634 A1 | 1/2009 | Sikora et al. |
| 2009/0097844 A1 | 4/2009 | Healey |
| 2009/0135428 A1 | 5/2009 | Healey |

FOREIGN PATENT DOCUMENTS

| | | |
|---|---|---|
| EP | 0 360 449 A2 | 3/1990 |
| EP | 0364093 | 4/1990 |
| EP | 0 376 449 A1 | 7/1990 |
| EP | 0 377 549 | 7/1990 |
| EP | 0513381 | 11/1992 |
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1236985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |
| GB | 2 126 820 A | 3/1984 |
| GB | 2 205 174 A | 11/1988 |
| GB | 2 219 166 A | 11/1989 |
| GB | 2 262 803 A | 6/1993 |
| GB | 2 264 018 A | 8/1993 |
| GB | 2 401 738 A | 11/2004 |
| JP | 2001-194109 | 7/2001 |
| WO | WO 93/25866 A1 | 12/1993 |
| WO | WO 97/05713 A1 | 2/1997 |
| WO | WO 01/67806 A1 | 9/2001 |
| WO | WO 02/065425 A1 | 8/2002 |
| WO | WO 03/014674 A2 | 2/2003 |
| WO | WO 2005/008443 A2 | 1/2005 |

OTHER PUBLICATIONS

UK Search Report dated Dec. 4, 2003 in GB Application No. GB 0322859.0.

Gupta et al., "Capacity Bounding of Coherence Multiplexed Local Area Networks Due to Interferometric Noise," IEE Proc.-Optoelectron., vol. 144, No. 2, pp. 69-74, Apr. 1997.

Liang et al., "Modified White-Light Mach Zehnder Interferometer for Direct Group-Delay Measurements," Applied Optics, vol. 37, Issue 19, Abstract, Jul. 1998.

Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.

International Search Report for PCT/GB2005/003594 dated Dec. 16, 2005.

International Search Report for PCT/GB2005/003680 mailed Dec. 1, 2005.

U.S. Appl. No. 10/573,266, filed Mar. 23, 2006, Sikora et al.

U.S. Appl. No. 11/791,927, filed May 31, 2007, Sikora et al.

U.S. Appl. No. 11/791,923, filed May 31, 2007; Healey et al.
U.S. Appl. No. 11/663,954, filed Mar. 28, 2007, Sikora et al.
U.S. Appl. No. 11/663,957, filed Mar. 28, 2007, Healey et al.
U.S. Appl. No. 11/885,275, filed Aug. 29, 2007, Heatley et al.
U.S. Appl. No. 11/885,400, filed Aug. 27, 2007, Heatley et al.
U.S. Appl. No. 11/916,054, filed Nov. 30, 2007, Sikora et al.
U.S. Appl. No. 11/887,382, filed Sep. 28, 2007, Healey et al.
U.S. Appl. No. 12/295,784, filed Oct. 2, 2008, Healey et al.
U.S. Appl. No. 12/280,051, filed Aug. 20, 2008, Healey.
U.S. Appl. No. 12/280,047, filed Aug. 20, 2008, Healey.
U.S. Appl. No. 12/280,038, filed Aug. 20, 2008, Healey.
International Search Report dated Nov. 22, 2005.
International Search Report mailed May 29, 2006 in PCT/GB2006/000759.
International Search Report mailed Jun. 30, 2006, dated Jun. 7, 2006, in PCT/GB2006/001173.
International Search Report mailed Jul. 17, 2007 in PCT/GB2007/001188.
International Search Report mailed Jul. 27, 2006 in PCT/GB2006/001993.
International Search Report mailed Apr. 13, 2007 in PCT/GB2007/000360.
International Search Report mailed Apr. 18, 2007 in PCT/GB2007/000343.
International Search Report mailed May 2, 2007 in PCT/GB2007/000359.
International Search Report dated May 16, 2006 in PCT/GB2005/004850.
International Search Report dated Mar. 15, 2006, mailed Mar. 24, 2006 in PCT/GB2005/004873.
UK Search Report dated May 24, 2005 in GB506591.7.
Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Security, Military University of Technology, IEEE 2001, pp. 142-148.
"Fading Rates In Coherent OTDR," Electronics Letters, vol. 20, No. 11, May 24, 1984.
International Search Report mailed May 8, 2006 in PCT/GB2006/000750.

* cited by examiner

OPTICAL SENSOR WITH INTERFEROMETER FOR SENSING EXTERNAL PHYSICAL DISTURBANCE OF OPTICAL COMMUNICATIONS LINK

RELATED APPLICATIONS

This is a continuation-in-part of our earlier co-pending commonly assigned application Ser. No. 10/573,266, filed Mar. 23, 2006, which is a US national phase of international application PCT/GB2004/004169 filed 29 Sep. 2004 which designated the U.S. and claims benefit of GB 0322859.0, dated 30 Sep. 2003, the priority benefits of all these prior applications is hereby claimed and the entire contents of all applications are hereby incorporated by reference.

TECHNICAL FIELD

The present disclosure relates to the general field of optical sensing, and more particularly to optical sensing using an interferometer arrangement.

BACKGROUND

It is known to use an optical fiber to sense an external disturbance or other effect external to the fiber. For example, U.S. Pat. No. 6,459,486 is directed to a sensing system in which an interferometer system is used to detect a time varying disturbance. In such a system, the disturbance causes a phase shift in sensing signals carried by the waveguide, which phase shift can then be detected interferometrically. However, if the event creates only a weak disturbance to the fiber, the resulting phase shift is also likely to be weak, with the result that the disturbance may be difficult to detect.

SUMMARY

An exemplary method of sensing an external effect interferometrically, includes: transmitting pairs of signal copies onto an optical link, the signal copies being transmitted in the same direction along the link and with a temporal offset relative to one another, the optical link being arranged such that the external effect causes at least a phase modulation of the transmitted signal copies; receiving modulated signal copies previously transmitted onto the link; and, for received pairs of signal copies, causing one signal copy of a pair to interfere with the other signal copy of that pair so as to produce an interferometric signal representative of the external effect, wherein the first and second signals are caused to interfere with a phase offset relative to one another, the phase offset being a non integer multiple of 180 degrees.

Because the received first and second signals are caused to interfere with an imposed phase offset relative to one another, a weak disturbance or other external effect can be sensed with increased sensitivity (in comparison to the situation where a phase offset is not imposed between the first and second signal after the signals have suffered a phase modulation).

The external effect may be an acoustic wave with data modulated thereon, for example generated by a modulator device, in particular an acoustic modulator device (as used herein, the term "acoustic" will be understood according to its normal meaning, such that it includes audible as well as non-audible frequencies such as ultrasound). In such situations, the sensing method may be used for secure communication. Alternatively or in addition, the external effect may be a disturbance caused for example by an eavesdropper moving the waveguide or, if the waveguide is buried underground or is located under water, the external effect may be caused by acoustic vibrations in the ground or water respectively.

Preferably, the first and second signal copies are caused to interfere at a coupling stage having: a first waveguide at which the first signal copies are received, a second waveguide at which the second signal copies are received, and a third waveguide, each one of the waveguides being coupled to each of the other two waveguides such that the first and second signal copies interfere with the phase offset. This will provide a phase offset that is constant. Such a coupling stage will normally have N inputs and N outputs (for an N by N or N×N coupling stage), N being an integer greater or equal to three, and will, by virtue of the coupling between the waveguides, inherently impose a phase offset between light waves in different waveguides that are coupled (for light waves coupled from one waveguides to another).

The light source will preferably have a coherence time associated therewith, which coherence time is less than the temporal offset, for example less than the offset by a factor at least 1000. The coherence time may be as little as 10 pico seconds or even 1 pico second. By coherence time, it is meant the time scale on which phase irregularities in the output waveform of the source occur, the irregularities occurring randomly. At least some of the phase irregularities in the waveform will be common to each copy of a given pair, with the result that the copies of a given pair need not be exact duplicates of one another.

The optical source will preferably be a continuous source, providing a waveform that is continuous or at least partly continuous. In such a situation, the signals transmitted onto the link will only be conceptually distinct from one another, since in practice adjacent signals will be joined seamlessly.

If desired an optical sensing system may be used to sense an eavesdropper, and or in addition, may be used to sense data in such a way that allows the data to be transmitted in a secure fashion.

In one exemplary embodiment, the copies of a pair of signals are be delayed relative to one another at the first location, such that a leading copy and a trailing copy are transmitted from the first location, the leading copy arriving at the second location before the trailing copy. The signal copies can then be returned to the first location, where the leading copy is delayed relative to the trailing copy, such that both copies can be combined substantially in step with one another (subject to the imposed phase offset). This can be achieved by feeding the output from the optical source to an interferometer stage, such as an un-balanced Mach Zehnder interferometer, where the signal is copied, one copy being channelled to one path of the interferometer, while the other copy is channelled to another path of the interferometer, the transit time associated with each path being different, such that a relative or differential delay results between the time at which the signal copies are transmitted from the interferometer stage. The same interferometer stage can then be employed to re-align the returned signal copies of a pair in a particularly convenient manner, since the relative delay imposed in the outbound direction will be the same as the relative delay imposed in the return direction, this being in each case determined by the difference in the transit times of the two paths. However, use of a 3×3 coupler for example will impose a relative difference bewteen the otherwise re-aligned signal copies.

The signal will preferably be output from the source as a continuous stream and transmitted along a the same optical fiber such that the signals travel in single mode fashion. The signals will reflected or backscattered along the link in order to return the signals to the first location.

DETAILED DESCRIPTION OF EXEMPLARY EMBODIMENTS

Figure 1:
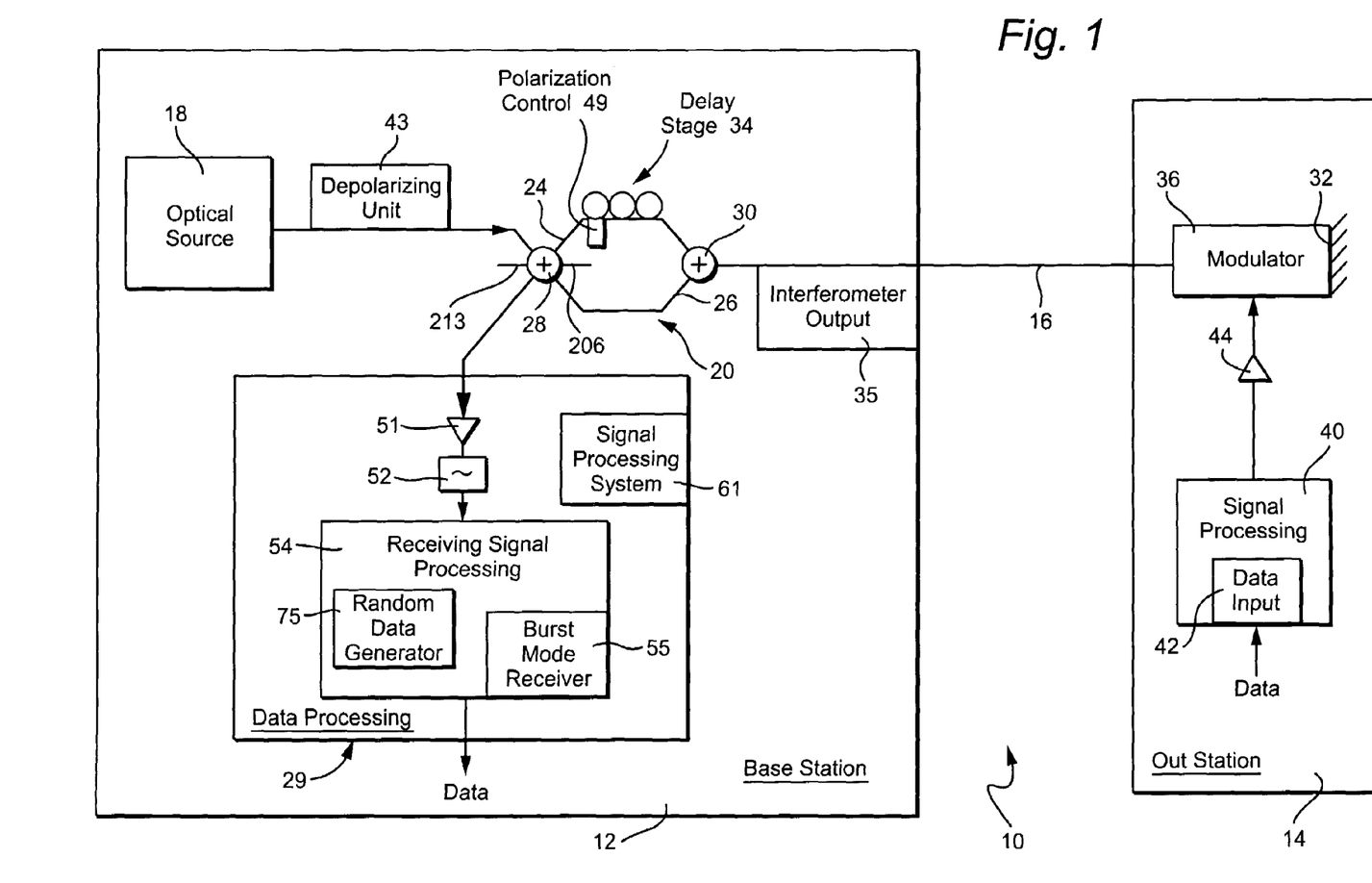
FIG. 1 shows an exemplary sensing system.

FIG. 1 shows a first exemplary embodiment in which a base station 12 can receive and sense data from an outstation 14 connected to the base station by an optical communications link 16. The base station 12 includes an optical source 18 with a short coherence time. Wavetrain portions from the optical source 18, also known as carrier signals and hereinafter referred to simply as signals, are fed to an interferometer stage 20, here a Mach Zehnder interferometer having a first path 24 and a second path 26. The interferometer 20 includes first coupling stage 28 for coupling optical radiation between the optical source 18, the first and second paths 24, 26, and data processing apparatus 29. For light travelling in a forward direction, that is, towards the outstation 14, the first coupling stage 28 acts as a directional power (intensity) splitter, channelling light from the optical source 18 to each of the paths 24, 26, the power to each path being shared in a predetermined manner (preferably equally) between the ports provided at first coupling stage. Consequently, for each signal provided by the optical source 18 in a given time interval, that signal is copied such that there is a first copy and a second copy.

In the present example, the first coupling stage is a 3 by 3 coupler, that is, a coupler having three input and three output ports. The advantages of using a 3 by 3 coupler are discussed in more detail below with reference to FIG. 2.

Returning to FIG. 1, one signal copy travels along the first path 24 while the other copy travels along the second path 26. A second coupling stage 30, here a 2 by 2 coupler, is provided for coupling light between the first and second paths 24, 26 and an output 35 of the interferometer, which output is connected to a waveguide of the transmission link 16, the waveguide being arranged to carry light in a single mode fashion at the transmission wavelength of the signals from the source. For light travelling in the forward direction, the second coupling stage 30 acts as a combiner, combining the light from the first and second paths and channelling this combined light to the interferometer output 35. The first path of the interferometer has a delay stage 34 for increasing the transit time of light travelling therealong between the first and second coupling stages 28, 30, such that the transit time for light travelling between the coupling stages 28, 30 is higher along the first path 24 than it is along the second path 26. For each signal produced by the optical source, the interferometer 20 serves to delay one of the signal copies relative to the other signal copy, the signal copies being transmitted onto the link 16 at different times to one another.

The differential delay imposed by the delay stage 34 is much greater than the coherence time of the optical source 18. Thus, when light travelling along the first and second paths is recombined by the second coupling stage 30, the interference between light travelling along the two paths averages out, such that on average (over a timescale much greater than the coherence time) the amplitude of light upon recombination at the second coupling stage 30 is equal to the amplitude of light from the optical source 18 (neglecting any losses in the interferometer 20 or coupler(s) due to absorption or backscattering, for example).

The outstation 14 comprises reflector means, such as a reflecting surface 32 for returning signals to the base station 12. Alternatively, the reflector means may be formed by a loop, the end of the fiber link 16 being connected to a point along the fiber at a 3-way coupler or circulator so as to form the loop. Modulator 36 are also provided, the modulator 36 being arranged in the path of the return signals so as to modulate the return signals with data. Distributed backscattering along the link will return part of the signal intensity.

For return signals, that is, for return signals returning to the interferometer 20 from the outstation 14, the second coupling stage 30 acts as a power splitter, in a similar fashion to the action of the first coupling stage 28 on light in the forward direction from the optical source 18. The first coupling stage 28 then serves to combine light from the first and second paths in the return direction, channelling the combined light to the data processing apparatus 29. In this way, return signals are copied at the second coupling stage 30, one copy being channelled along the first path 24, while the other copy is channelled along the second path 26.

For each signal generated by the source 18, there are four duplicates of this signal: a non-retarded signal S0 which has travelled along the second path 26 of the interferometer 20 in both the forward and reverse directions; a first retarded signal S1 delayed by a delay D in the forward direction (but not the reverse direction); a second retarded signal S2 retarded by the delay D in the reverse direction (but not the forward direction); and, a twice-retarded signal S3 retarded by a delay 2D, signal S3 being retarded in each of the forward and reverse directions.

The first and second retarded signals S1, S2 which are retarded in one direction only will be returned to the first coupler stage 28 at the same time. In the absence of any modulation at the outstation 14, these signals are copies of one another and the signals will interfere or otherwise combine with a predetermined phase offset at the first coupler stage 28. However, if one of the signals is modulated with data, in particular if one of the pair of signals S1, S2 is phase modulated with data, the interference between the two signals will result in a signal which is representative of the modulating data.

In more detail, the optical source 18 produces a continuous optical stream, and so the transmission link 16 will carry two superposed duplicate signal streams in the forward direction, one stream lagging the other by the differential delay D of the first interferometer path 24. If at the outstation 14 the incoming signal streams are reflected by the reflector 32 and modulated by the modulator for a time interval, for each portion of modulated signal stream, there will be a corresponding portion that is un-modulated, the un-modulated portion lagging the modulated portion by the differential delay D (the modulated portion is surrounded by unmodulated portions whose duration is greater than D). In the return direction, the interferometer 20 will delay the modulated portion and will cause the modulated and un-modulated signals (S1 and S2) to interfere such that the modulated data can be extracted.

However, an unauthorized person wishing to obtain the data by tapping the transmission link signal 16 will need to know the delay between the modulated and un-modulated signal portions, in order to combine these in registry with one another (the modulated portion is surrounded by unmodulated portions whose duration is greater than D). In contrast, the data can easily be extracted at the base station 12, since the delay stage 34 employed for causing the differential delay by retarding one of a pair of signal portions is itself used for cancelling this differential delay by retarding the other of the two signal portions.

To control modulation of the signal stream at outstation 14, there is provided a signal processing unit 40, the signal processing unit having a data input 42 for receiving data which is to be modulated on the signal stream. The signal processing unit 40 will be configured to modulate data in burst mode, the duration of modulation bursts or periods being less than the differential delay D, the time between bursts (i.e., the non-modulation periods) being longer than the differential delay. This will reduce the risk that two modulated signal portions will be combined. The signal processing unit 40 is coupled to a modulation driver 44, which modulation driver 44 in turn controls the operation of the modulator 36.

The modulator may be a Lithium-Niobat, or other modulator operating according to the electro-optic effect. However, the modulator will preferably be an acoustic modulator which includes an acoustic transducer for generating acoustic waves, the acoustic transducer being external to the waveguiding medium carrying the optical signals. Normally, where the signals are carried by an optical fiber, optionally in a cable, the acoustic modulator will be external to the cable or the fiber. However, the transducer will be acoustically (i.e., mechanically) coupled to the waveguiding medium to allow the acoustic vibrations from the transducer to affect the phase of the signals propagating along the waveguiding medium.

The light source may be a Light Emitting Diode, a Fabry-Perot Laser Diode, or a source of amplified spontaneous emission such as an Erbium-Doped Fiber Amplifier or a Semiconductor Optical Amplifier, but preferably the light source will be a Super Luminescent Diode, since this has a broad and smooth power spectrum, and a short coherence time of about 0.5 ps or less. The radiation produced by the optical source will preferably be unpolarized, or alternatively a de-polarizing unit 43 may be provided between the light source and the interferometer, for depolarizing the light before the light is injected into the interferometer (the de-polarizing unit may be for example, a Fiber Lyot de-polarizer). A polarization controller 49 will preferably be provided in one of the paths of the interferometer, here, the first path, so that the polarization of light from the first path combining in the return direction at the first coupler 28 is at least partially aligned with that of the light from the other path.

Typically, the source will operate at a wavelength of around 1.3 microns, in order to efficiently make use of standard telecommunications optical fiber, such fiber being configured to support single mode transmission at this wavelength. Typically, the fiber will have a single core of a diameter which is around 9 or 10 microns. However, dispersion-compensating fiber may be employed, in which case the source may transmit at a wavelength of 1.55 microns. Typically, the length of fiber employed to connect the base station to an outstation will be at least 1 km, normally at least 10 km, fiber lengths of over around 50 km or 60 km being possible. Clearly, fiber length are not limited to 50 km or 60 km.

The data processing apparatus 29, receives from the coupling stage 28 an optical interference (combination) signal produced at the first coupling stage as a result of interference between a modulated signal portion and an un-modulated signal portion. The data processing apparatus 29 is configured to convert the optical interference signal from the first coupling stage into a data signal from which the content input at the outstation 14 can readily be obtained. The data processing apparatus includes: a photo-receiver 51 coupled to the first coupling stage 28 for converting optical signals into electrical signals; a filter 52 for receiving electrical signals from the photo-receiver 51 and filtering the electrical signals; and, a signal processing unit 54 for processing the filtered electrical signals. The filter 52 will be configured to remove frequencies likely to impede the extraction of the transmitted data from the outstation. In particular, the filter will be configured to remove noise, having a transmission bandwidth of 700 Mz for a transmission rate of 1 Gbit/s. To achieve random or pseudo random selection, the signal processing unit 54 may be equipped with a random or pseudo random data or number generator 75.

The purpose and operation of the signal processing apparatus 29 and the signal processing unit 40 can generally be described as follows. At the transmitter it is useful to form a burst-mode data packets of the correct duration (P) and separation (G). It is also useful to encode the data using a line-code such as "Bi-phase Mark" which is tolerant of transmission polarity ambiguity. The packet may also carry synchronisation and clock information -as is well known in the art of data transmission. The modulator driver 44 is used to drive the phase modulator 36 (for example a Lithium Niobate phase modulator) with a suitable voltage in order to give the desired phase modulation depth. The modulation depth may be varied in order to optimize the overall system performance in terms of signal to noise ratio. At the signal processing apparatus 29, the signal is first filtered by the filter 51, the transmission bandwidth thereof being chosen so as to match the data modulation spectrum of the received signal. (The filter may also be used to separate low frequency components due to background disturbances onto a separate signal processing system 61). The (receiving) signal processing unit 54 at the base station 12 comprises a burst mode receiver 55, matched to the (transmitting) signal processing unit 40 at the outstation 14, which performs the functions of clock recovery, burst synchronization, decoding of the line-code in order to recover the transmitted packet, and selection of one of the two copies of the received data packet. The burst mode receiver 55 might also be used to re-assemble the received data into a continuous data stream. Other functions such as error detection/correction may also be applied at the burst mode receiver 55. The paths 24, 26 of the interferometer 20 are formed by optical fiber, the delay stage 34 of the first path being a portion of fiber, such that the length of fiber forming the first path 24 is greater than that of the second path 26, in order to introduce the differential delay D in the first path. Typically, the fiber portion of the delay stage 34 will be several km in length. If the coherence length of the source is about 0.5 pico seconds (corresponding to an optical bandwidth of about 10 nm), the length of fiber travelled in a typically coherence time is about 0.1 mm in optic fiber (this length being the coherence of the wavetrains in the fiber).

To extract the data carried over the link 16, the differential delay should be known to within plus or minus kL, where k is a scaling factor less or roughly equal to 3. Thus, for a delay line of 10 km, the accuracy to which the length of the delay line must be reproduced in order to extract the data (using another interferometer to the interferometer used to cause the differential delay) is about one part in $10^8$. Thus, by using a very high ratio of D/L, it makes it unlikely that a person tapping the link 16 will be able to ascertain the correct value of D, in particular to the necessary accuracy to extract the data.

Because the present system allows communication over an existing fiber, the system may conveniently be used with existing communication structures. In particular, the system may be used with a passive optical network, as shown in FIG. 1, where the base station 12 is connected to a plurality of outstations 14, each of which is connected to the base station by a respective fiber. In such a situation, the second coupling means 30 of FIG. 1 will be adapted to couple the first and second paths to a plurality of transmission links 16.

In a further exemplary embodiment, the apparatus shown in FIG. 1 may be used for monitoring a fiber or other optical link, without necessarily being used for the secure communication of data. That is, the apparatus of FIG. 1 can be used to sense if the transmission link 16 has been disturbed, for example by an acoustic vibration or other time varying event, rather than sensing disturbances which have the form of a data signal. In such a situation, the optical source may be a source having a long coherence length. Features of the implementation for secure transmission are applicable mutatis mutandis to the monitoring of a fiber link.

A physical disturbance in the link is likely to result in an interference or combination signal from the first coupling stage 28, since when a disturbance occurs, the disturbance is likely to cause a phase and/or amplitude modulation in one to the (carrier) signals travelling along the link. Unlike the data modulation, a continuous disturbance will result of in the interference between on the one hand a carrier signal having been modulated by the disturbance at one time and, on the other hand, a signal modulated by the disturbance at another time, the two times being separated by the differential delay D. However, if the disturbance is an analog signal (for example, an acoustic signal formed by audible sounds such as speech) the continuous nature of the disturbance (as opposed to burst mode behavior) is unlikely to prevent the signal from being recovered sufficiently well to be useful.

Some disturbances are likely to change the spectrum of background "noise" as well as the level of noise, such that different disturbances will have different characteristic spectrum types. The distance between the base station and the point where a disturbance is occurring may also affect the spectrum. The signal processing system 61 may therefore be configured to compare the noise spectrum at intervals with stored spectrum signatures for known disturbances, and to generate a disturbance alert signal if a monitored spectrum is found to match one of the known signatures. Alternatively, or in addition, the signal processing system 61 may be configured to run a learning algorithm in order to learn the characteristic spectrum types for different disturbances experienced along the particular optical fiber path which is being monitored.

Figure 2:
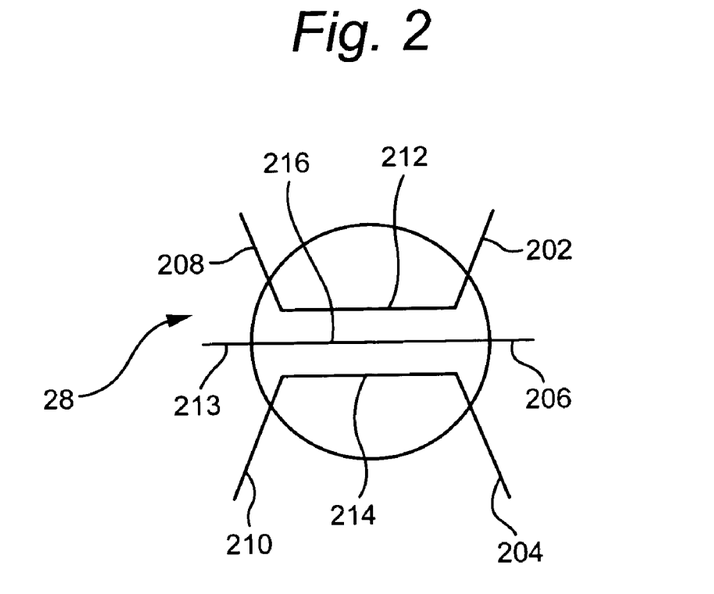
FIG. 2 shows in more detail a coupler arrangement of FIG. 1.

Reference is now made to FIG. 2, which shows in more detail the first coupling stage 28, at the source side of the interferometer (whereas first coupling stage 28 is a 3×3 coupler, the second coupling stage 30, at the transmission side of the interferometer, is a 2×2 coupler with one port terminated). The coupling stage has three inputs and three outputs (the terms output and input are used here with reference to radiation travelling in the return direction, that is towards the source: the outputs and inputs are each bi-directional, and can each be used to introduce radiation into the coupler as well as to receive radiation form the coupler). Of the three inputs and outputs, a first input 202 is connected to the first path 24 of the interferometer, a second input 204 is connected to the second path 26, a third input 206 is unused, a first output 208 is connected to the optical source, a second output 210 is connected to the photo receiver 51, and, third output 213 is unused. There is provided a first, a second and a third waveguide 212,214,216 respectively extending between the first, second and third inputs and outputs. Each of the waveguides are coupled in a coupling region, such that radiation travelling along each of the waveguides is coupled to each of the other waveguides. That is, radiation travelling along the first waveguide is coupled to the second and third waveguides, radiation travelling along the second waveguide is coupled to the first and third waveguides, and, radiation travelling along the third waveguide is coupled to the first and the second waveguides. The coupler 28 is a balanced coupler, such that the degree of coupling (given by the coupling coefficient) between each given pair of waveguides is substantially equal. The unused output and input are terminated so as to reduce the amount of reflection.

The 3×3 coupler is used in order to create a relative phase bias of $\phi_b=120°$ between the optical fields on its output ports. This can be used to improve the sensitivity of the interferometer when detecting disturbances due to cable handling, street works or unauthorized interference. (We denote the phase modulation due to a disturbance as $\phi_d(t)$, since the disturbance modulation is time-varying, wherein the phase offset provided by the coupler is contstant). It can be shown that the receiver ac output signal is proportional to: $r_{ac}(t)=k\text{Cos}\{\phi_b+\phi_d(t)\}$ where, k is a constant of proportionality. The equation shows how the phase bias can be used to select a higher slope region of the cosine function in order to improve the sensitivity when the magnitude of the disturbance is small (it can also be shown that the output signal $r_{ac}(t)$ will have opposite polarity for the two copies of the modulated signal since they are incident on different arms of the interferometer).

Figure 3:
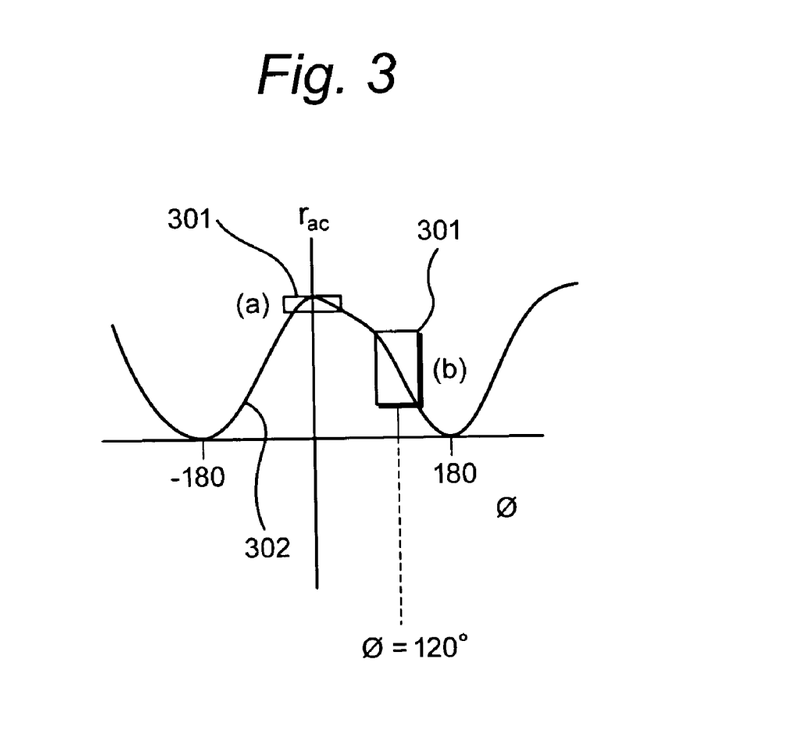
FIG. 3 illustrates a small signal 301 on the cosine response curve 302 of the interferometer ($r_{ac}$ against phase in degrees), with (a) no phase offset, and (b) a 120 degree phase offset.

Thus, by using the inherent properties of a coupler, it is possible to impose a phase offset which will increase the sensitivity of the sensing system for small signals, which would otherwise lie in the low-gradient portion of the cosine curve. Although the coupler may be used when detecting large amplitude signals, the benefit, if there is any, will be less than that obtained when detecting small signals, since the large amplitude signals are likely to already extend the ac output signal into the higher slope region of the cosine curve. Furthermore, the reduced output level with a 3×3 coupler as compared to a 2×2 coupler could make the use of a 3×3 coupler undesirable for high amplitude signals. The use of a 3×3 coupler will be more appropriate when the signals are the result of an external effect, in particular the effect of external acoustic waves, since these are likely to result in a small phase shift on signals propagating along the link: that is, the acoustic waves will represent themselves as small signals. This is shown in FIG. 3, which illustrates a small signal 301 on the cosine response curve 302 of the interferometer ($r_{ac}$ against phase in degrees), with (a) no phase offset, and (b) a 120 degree phase offset.

It should be noted that although the interferometer introduces a phase offset between signals travelling on the different paths, this phase difference is cancelled when considering signals that have travelled to and from the disturbance, that is, signals S1 and S2 in the example above. However, because of inherent properties of the 3×3 coupler and a careful analysis of the paths taken by the signals S1 and S2, it can be shown that the signals S1 and S2 interfere with a phase offset.

In conclusion, the embodiment of FIG. 1 can be described in the following terms. FIG. 1 shows a block schematic of the single-mode fiber secure transmission system and/or sensor system. It comprises a low-coherence broadband light source (For an incoherent source with an optical bandwidth of 12 nm, the coherence length will be of order 0.1 mm). Ideally, the light source generates un-polarized light, or its light is depolarized before injecting into the interferometer (for example, by using a Fiber Lyot de-polariser). Light from the source is coupled into an un-balanced Mach-Zehender interferometer employing a 3×3 port coupler on its input leg. The two optical paths in the Mach-Zehender interferometer have a differential delay 'D' which may be due to several km of optical fiber (the exact length does not need be known providing D>>τ-the coherence time of the source). Thus, in the forward direction, the couplers act as simple power splitters and provide two copies of the source signal to the remote reflection-mode optical phase modulator (one delayed by D relative to the other). These are phase modulated and returned to the interferometer where they undergo a further differential delay D which creates two copies of the modulated signals (giving four signals in total). Due to the action of the differential delay, two of these copies are now in phase synchronism and will therefore undergo coherent mixing when their polarizations are aligned. This mixing (or interference effect) converts the phase modulation imparted remotely into intensity modulation at the interferometer output port.

To help in further understanding this exemplary embodiment: the differential delay D in the unbalanced Mach-Zehender interferometer results in there being two copies of the optical source signal at the remote phase modulation position, separated in time by D. As D>>τ (the coherence time of the source) these two source signals are effectively un-correlated at this point. Both signals are phase modulated by the data and are returned to the un-balanced Mach-Zehender interferometer. This time, the interferometer creates two copies of the modulated signals—resulting in four signals in total, two on each arm. Consider the point where these signals arrive back at the 3×3 coupler. We will find that each arm now carries a signal that has undergone one delay increment D. (This occurred on the outward journey for one of the signals, and on the return journey for the other.) Clearly, as these signals have undergone the same total propagation delay they will be correlated (or coherent) when they combine in the 3×3 coupler. Hence they will beat-down to reveal the modulation applied at the remote terminal. (The phase modulation will be converted into amplitude modulation by the action of the interferometer.) The other signals remain un-correlated and will therefore not beat down to reveal the data or disturbance modulation. The important point to recognize, however, is that the two signals which do beat down went through the remote phase modulator at different times (separated by D), hence we will have two copies of the modulation.

Thus there has been shown and described novel exemplary sensing system. Many changes, modifications, variations, uses and applications of the subject invention will however will become apparent to those skilled in the art after considering this specification and the accompanying drawings. All such changes, modifications, alterations and other uses and applications are deemed to be covered in this invention which is limited only by the claims.

What is claimed is:

1. A method of sensing an external physical disturbance of an optical communications link interferometrically, said method comprising:
   transmitting pairs of signal copies onto an optical communications link, the signal copies being transmitted in the same direction along the link and with a temporal offset relative to one another, the optical link being arranged such that an external physical disturbance of said optical communications link causes at least a phase modulation of the transmitted signal copies;
   receiving from the link modulated signal copies previously transmitted onto the link; and
   for received pairs of signal copies, causing one signal copy of a pair to interfere with the other signal copy of that pair so as to produce an interferometric signal representative of the external physical disturbance of said optical communications link,
   wherein the pairs of signal copies are caused to interfere with a phase offset relative to one another, the phase offset being a non integer multiple of 180 degrees.

2. A method as in claim 1, wherein the phase offset is constant.

3. A method as in claim 1, wherein the pairs of signal copies are caused to interfere at a coupling stage having:
   a first waveguide at which first signals of pairs of copies are received,
   a second waveguide at which second signals of pairs of said copies are received, and
   a third waveguide,
   each one of the three waveguides being coupled to each of the other two waveguides such that the first and second signals interfere with the phase offset.

4. A method as in claim 3, wherein:
   the first and second signals are passed through an interferometer arrangement having a first path and a second path, the first and second paths being coupled at the coupling stage.

5. A method as in claim 1, wherein the pairs of signal copies are formed using signals from a light source having a coherence time associated therewith, which coherence time is less than the temporal offset.

6. An optical sensing system for sensing an external physical disturbance of an optical waveguide, including a light source and an unbalanced interferometer arrangement arranged such that radiation from the light source can be transmitted through the interferometer arrangement and onto the optical waveguide, the interferometer arrangement comprising:
   a first coupling stage coupled to the light source;
   a second coupling stage for coupling to the waveguide;
   a first path; and
   a second path,
   the first and second paths each extending between the first and the second coupling stages,
   the first coupling stage having at least first, second, and third coupled waveguides,
   the first waveguide being arranged to receive radiation from the first path and to couple the received radiation onto at least the second and the third waveguides,
   the second waveguide being arranged to receive radiation from the second path and to couple the radiation onto at least the first and the third waveguides, and
   the interferometer arrangement providing an output representing an external physical disturbance of said optical waveguide.

7. An optical sensing system as in claim 6, wherein the first coupling stage is a 3×3 coupler, having a first, a second and a third output, the first output being connected to the optical source.

8. An optical sensing system as in claim 7, wherein the optical sensing system includes a photo detector for converting optical signals into electrical signals, the photo detector being connected to the second output of the first coupling stage.

9. An interferometric sensing method for sensing an external physical disturbance of an optical link, said method comprising:
   generating pairs of signal copies, which signal copies of a given pair are temporally displaced relative to one another;
   transmitting the time-displaced signal copies in the same direction as one another onto the optical link;
   receiving from said link previously transmitted signal copies;

using an interferometer arrangement to temporally realign the received signal copies from a given pair; and interferometrically combining the realigned signals of a given pair so as to generate an interferometer signal representative of an external physical disturbance of the optical link, wherein first and second signal copies of a given pair are combined with a predetermined phase shift relative to one another, the phase shift being a non-integer multiple of 180 degrees.

10. A method as in claim 9, wherein the interferometer arrangement is used to generate the time-displaced signal copies for transmission onto the optical link.

11. A method as in claim 9, wherein the interferometer arrangement includes an N×N coupler that is used to combine the signal copies of a given pair with the predetermined phase shift, N being an integer equal to or greater than three.

12. A method as in claim 9, wherein the interferometer arrangement is arranged to channel radiation such that it is shared between a first path and a second path and to recombine radiation from the first and second paths, the first and second paths of the interferometer arrangement having a differential delay associated therewith.

13. A method as in claim 9, wherein signal copies of a given pair are transmitted over a common waveguide of the optical link.

14. A method as in claim 9, wherein the signals are carried by the optical link in a single mode fashion.

15. A method of communicating data on an optical link between a first location and a second location while also sensing external physical disturbance of the optical link, the method comprising:

at the first location, generating output signals having an irregular phase component, and copying the output signals at least in part such that for each output signal, there is a pair of signal copies, the irregular phase component being common at least in part to each of the signal copies of a pair;

transmitting, from the first location, each signal copy of a pair over a common optical communications link to a second location, the signal copies being transmitted in the same direction as one another along the link;

at the second location, mixing data onto the irregular phase component of a signal copy for at least some of the pairs of signal copies; and at the first location, receiving from said optical link signal copies from the second location and, for pairs of received signal copies, interferometrically combining the respective irregular components of the signal copies of a pair in order to extract therefrom data mixed at the second location while also being able to detect external physical disturbance of the optical link, wherein the signal copies are interferometrically combined using an N×N coupler where N is an integer greater than or equal to three.

16. A method of sensing an external physical disturbance to an optical link, said method comprising:

transmitting radiation from a source onto the optical link, the radiation being passed through an unbalanced interferometer connected between the source and the link;

receiving radiation transmitted over the link, which radiation has travelled through a portion of the link which is subject to an external disturbance;

passing the received the radiation through the unbalanced interferometer; and using a detector to detect the radiation that has passed through the unbalanced interferometer, wherein the unbalanced interferometer provides an output representing a physical disturbance to said optical link and includes a coupler for coupling radiation to the detector, the coupler being an N×N coupler where N is an integer greater than or equal to three.

17. A method as in claim 16, wherein the radiation is returned to the interferometer by a process of reflection or distributed backscattering.

* * * * *